(12) United States Patent
Broughton

(10) Patent No.: US 12,546,455 B2
(45) Date of Patent: Feb. 10, 2026

(54) OPTIC FOR BACKLIGHT CONTROL

(71) Applicant: SIGNIFY HOLDING B.V., Eindhoven (NL)

(72) Inventor: Kevin Charles Broughton, Sharpsburg, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/877,565

(22) PCT Filed: Jun. 26, 2023

(86) PCT No.: PCT/EP2023/067286
§ 371 (c)(1),
(2) Date: Dec. 20, 2024

(87) PCT Pub. No.: WO2024/002955
PCT Pub. Date: Jan. 4, 2024

(65) Prior Publication Data
US 2025/0377087 A1    Dec. 11, 2025

Related U.S. Application Data

(60) Provisional application No. 63/357,686, filed on Jul. 1, 2022.

(30) Foreign Application Priority Data
Jul. 14, 2022   (EP) ..................... 22184981

(51) Int. Cl.
*F21V 7/00* (2006.01)
*F21S 8/08* (2006.01)

(52) U.S. Cl.
CPC ............ *F21V 7/0091* (2013.01); *F21S 8/086* (2013.01)

(58) Field of Classification Search
CPC .............................. F21S 8/086; F21V 7/0091
(Continued)

(56) References Cited

U.S. PATENT DOCUMENTS 8,628,222 B2   1/2014   Kelley
9,200,765 B1   12/2015  Broughton
(Continued)

FOREIGN PATENT DOCUMENTS

CN    107477529 A   12/2017
CN    210511099 U    5/2020
(Continued)

*Primary Examiner* — Toan C Ly

(57) ABSTRACT

An optical device (340) for a light fixture (100) includes an optic portion (550) that has an optic body (551) having a front end (548), a rear end (549), and a curved bottom surface disposed between the front end (548) and the rear end (549). The optic portion (550) also includes a cavity (541) disposed within the optic body (551), where the cavity (541) is open at a top side of the optic body, where the cavity (541) is configured to receive light emitted by a light source (427) of the light fixture (100). The optic portion (550) further includes a total internal reflector (TIR) (545) having a top portion (575) and a bottom portion (570), where the top portion (575) is disposed within the cavity (541) of the optic body and includes a back surface (546), where the bottom portion (570) extends beyond the curved bottom surface of the optic body (551), where the bottom portion (570) includes a first exterior TIR feature (574-1) and a second exterior TIR feature (574-2).

13 Claims, 12 Drawing Sheets

(58) Field of Classification Search
USPC .................................................. 362/296.05
See application file for complete search history.

(56) References Cited

U.S. PATENT DOCUMENTS

| | | | |
|---|---|---|---|
| 9,689,554 | B1 * | 6/2017 | Householder ...... G02B 19/0061 |
| 12,111,048 | B2 | 10/2024 | Ansems et al. |
| 2012/0268934 | A1 | 10/2012 | Holder |
| 2012/0287649 | A1 | 11/2012 | Kelley |
| 2012/0307495 | A1 | 12/2012 | Shih |
| 2014/0016326 | A1 | 1/2014 | Dieker et al. |
| 2014/0063802 | A1 | 3/2014 | Garcia |
| 2015/0192267 | A1 | 7/2015 | Goldstein |
| 2016/0047528 | A1 | 2/2016 | Goldstein et al. |
| 2016/0161084 | A1 | 6/2016 | Cho |
| 2017/0023206 | A1 | 1/2017 | Tsai et al. |
| 2018/0087751 | A1 | 3/2018 | Jung et al. |
| 2018/0294389 | A1 | 10/2018 | Tarsa et al. |
| 2019/0203910 | A1 | 7/2019 | Broughton |
| 2020/0028042 | A1 | 1/2020 | Tarsa et al. |

FOREIGN PATENT DOCUMENTS

| | | | |
|---|---|---|---|
| CN | 113091019 | A | 7/2021 |
| DE | 102019135021 | A1 | 6/2021 |
| EP | 3106745 | A1 | 12/2016 |
| EP | 3211297 | A1 | 8/2017 |
| EP | 3617581 | A1 | 3/2020 |
| WO | 2021057941 | A1 | 4/2021 |
| WO | 2021089365 | A1 | 5/2021 |

* cited by examiner

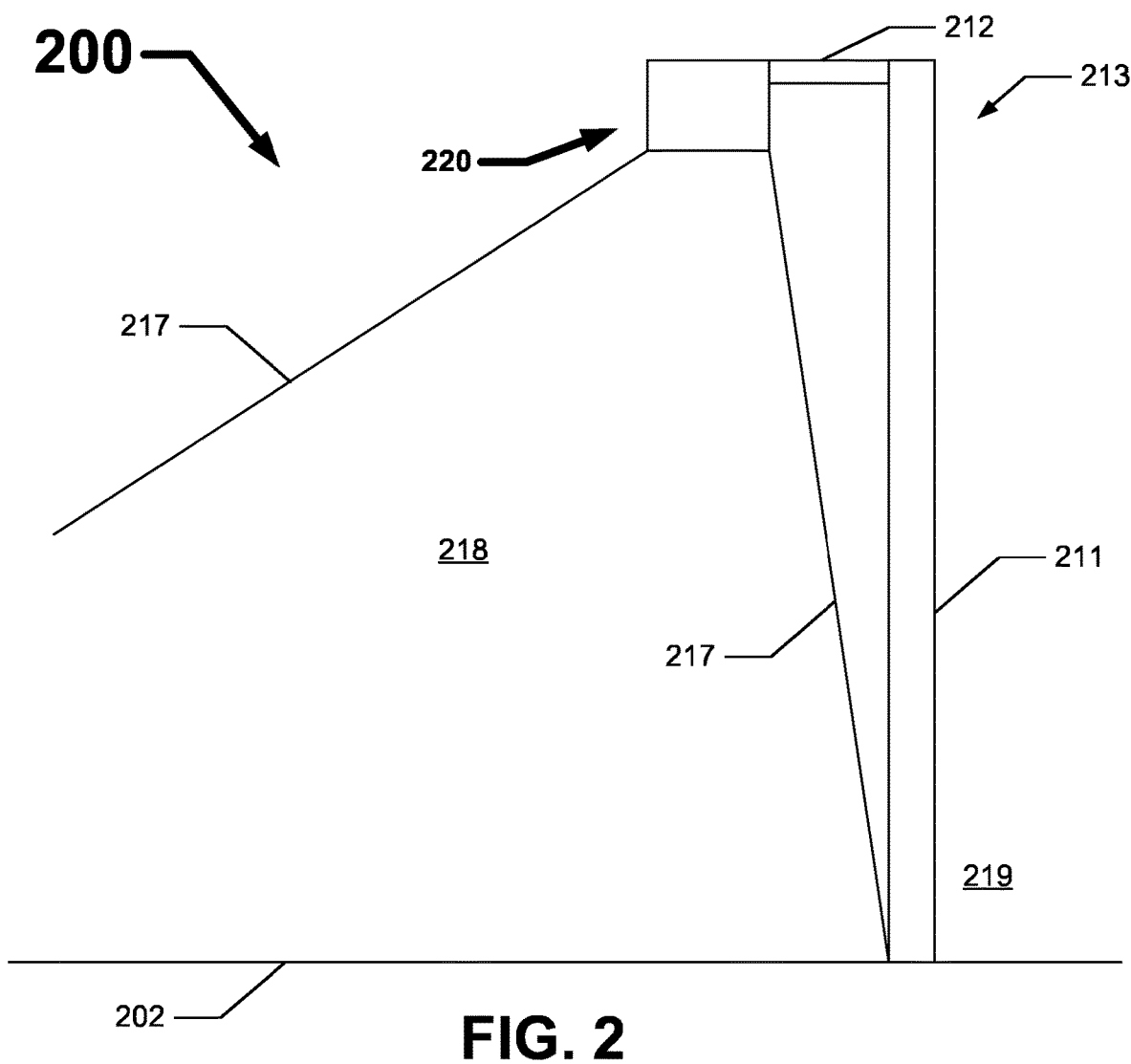
FIG. 2
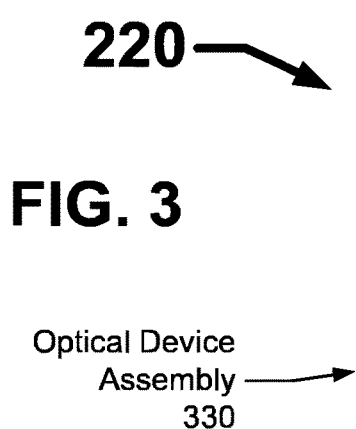
FIG. 3
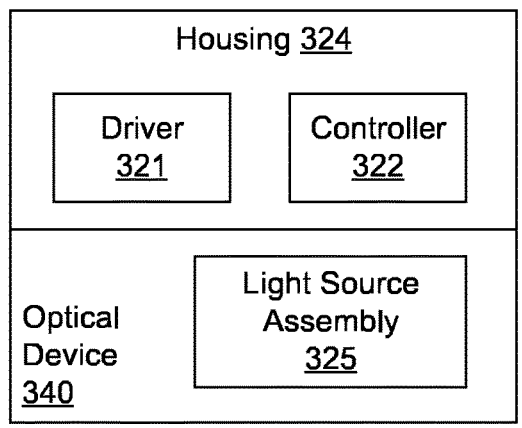

OPTIC FOR BACKLIGHT CONTROL

CROSS-REFERENCE TO PRIOR APPLICATIONS

This application is the U.S. National Phase application under 35 U.S.C. § 371 of International Application No. PCT/EP2023/067286, filed on Jun. 26, 2023, which claims the benefit of European Patent application Ser. No. 22/184,981.3, filed on Jul. 14, 2022, and U.S. Provisional Application No. 63/357,686, filed on Jul. 1, 2022. These applications are hereby incorporated by reference herein.

TECHNICAL FIELD

The present disclosure relates generally to lighting systems, and more particularly to systems, methods, and devices for optical devices that receive light from a light source and manipulate the light to generate particular light distribution patterns for backlight control.

BACKGROUND

In a number of outdoor lighting applications (e.g., streetlights, area lights), it is common for light to spill backwards toward a pole, property line, or other area. This light spillage, also called light trespass, is away from the intended target area, and so is not desired.

SUMMARY

In general, in one aspect, the disclosure relates to an optical device for a light fixture. The optical device can include an optic portion having an optic body having a front end, a rear end, and a curved bottom surface disposed between the front end and the rear end. The optic portion of the optic device can also include a cavity disposed within the optic body, where the cavity is open at a top side of the optic body, and where the cavity is configured to receive light emitted by a light source of the light fixture. The optic portion of the optic device can further include a total internal reflector (TIR) having a top portion and a bottom portion, where the top portion of the TIR is disposed within the cavity of the optic body and includes a back surface, where the bottom portion of the TIR extends beyond the curved bottom surface of the optic body, where the bottom portion of the TIR includes a first exterior TIR feature and a second exterior TIR feature, where the second exterior TIR feature is configured to redirect a first portion of a first subset of the light into a target volume of space in a first light distribution pattern and away from an avoided volume of space, where the second exterior TIR feature is further configured to redirect a second portion of the first subset of the light toward the first exterior TIR feature, where the first exterior TIR feature is configured to receive the second portion of the first subset of the light from the second exterior TIR feature and redirect the second portion of the first subset of the light into the target volume of space in a second light distribution pattern and away from the avoided volume of space, where the first exterior TIR feature is further configured to redirect a second subset of the light into the target volume of space in a third light distribution pattern and away from the avoided volume of space, and where the back surface of the TIR is configured to redirect a third subset of the light toward the target volume of space in a fourth light distribution pattern and away from the avoided volume of space.

In other aspects, the disclosure relates to a light fixture that includes an optic device assembly. The optic device assembly of the light fixture can include a light source assembly having a circuit board and a light source. The optic device assembly of the light fixture can also include an optical device. The optical device can include an optic body having a front end, a rear end, and a curved bottom surface disposed between the front end and the rear end. The optical device can also include a cavity disposed within the optic body, where the cavity is open at a top side of the optic body, and where the light source assembly is disposed in the cavity. The optical device can further include a total internal reflector (TIR) having a top portion and a bottom portion, where the top portion of the TIR is disposed within the cavity of the optic body and includes a back surface, where the bottom portion of the TIR extends beyond the curved bottom surface of the optic body, where the bottom portion of the TIR includes a first exterior TIR feature and a second exterior TIR feature, where the second exterior TIR feature redirects a first portion of a first subset of the light into a target volume of space in a first light distribution pattern and away from an avoided volume of space, where the second exterior TIR feature redirects a second portion of the first subset of the light toward the first exterior TIR feature, where the first exterior TIR feature receives the second portion of the first subset of the light from the second exterior TIR feature and redirects the second portion of the first subset of the light into the target volume of space in a second light distribution pattern and away from the avoided volume of space, where the first exterior TIR feature redirects a second subset of the light into the target volume of space in a third light distribution pattern and away from the avoided volume of space, and where the back surface of the TIR redirects a third subset of the light toward the target volume of space in a fourth light distribution pattern and away from the avoided volume of space.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 2 shows a lighting system according to certain example embodiments.

FIG. 3 shows a block diagram of the light fixture of FIG. 2.

DETAILED DESCRIPTION

Figure 1:
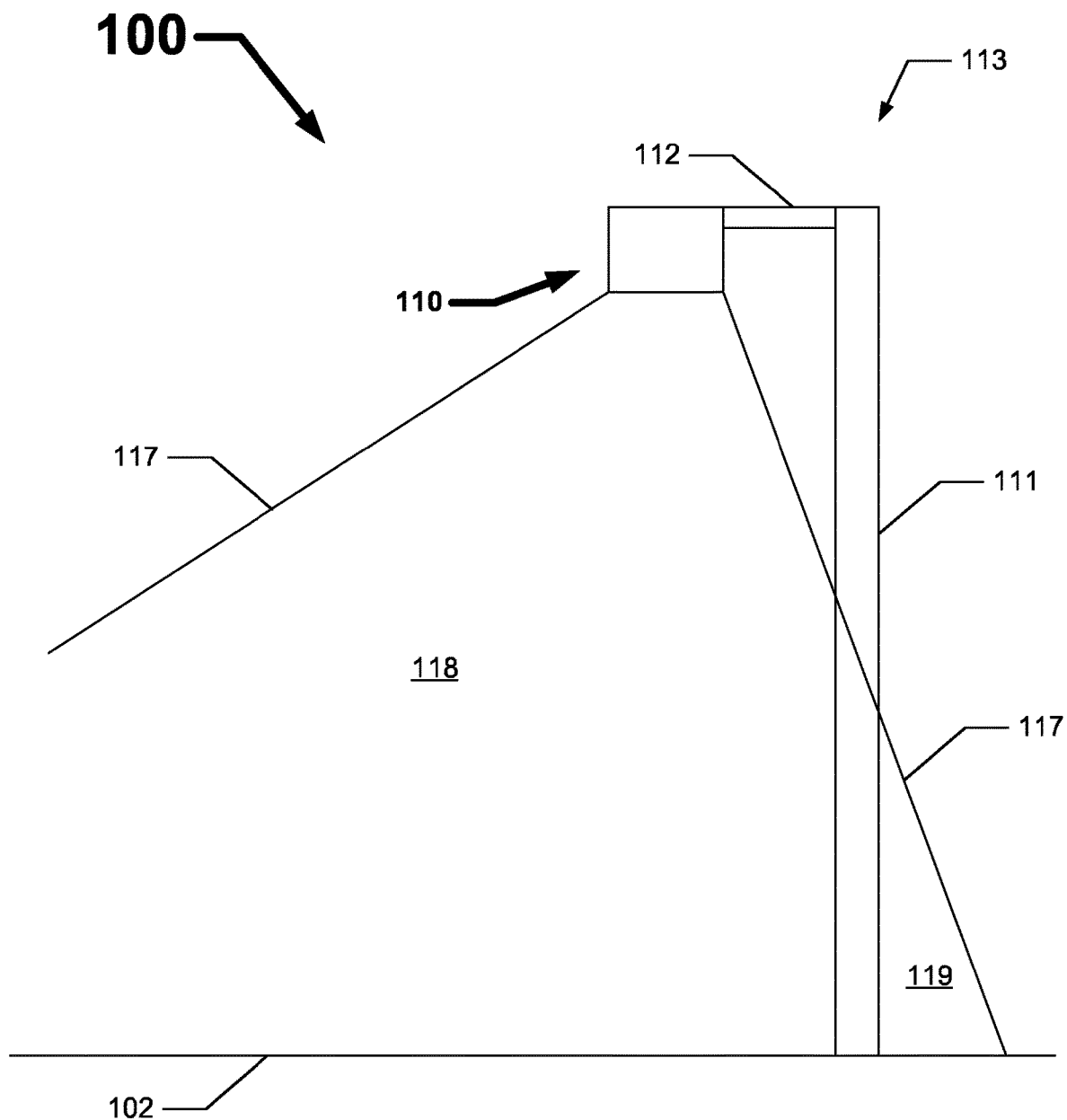
FIG. 1 shows a lighting system according to the current art.

In general, example embodiments provide systems, methods, and devices for backlight control using optics. Example embodiments can provide a number of benefits. Such benefits can include, but are not limited to, more controlled light distribution in certain volumes of space, an aesthetically pleasing appearance, ease of cleaning and maintenance, and compliance with industry standards that apply to light fixtures located in certain environments. Example embodiments can be used with new light fixtures or retrofit with existing light fixtures. Example embodiments described herein can be used with any of a number of different light fixtures, including but not limited to streetlights, parking lot lights, and outdoor area lights.

Light fixtures with example optics for backlight control can be located in one or more of any of a number of environments. Examples of such environments can include, but are not limited to, indoors, outdoors, a parking garage, a parking lot, a manufacturing plant, a warehouse, a road (e.g., a highway, a freeway, a residential street), and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Light fixtures with example optics for backlight control can be directly or indirectly mounted onto any of a number of different structures. Such structures can include, but are not limited to, a pole, a building wall, an outdoor facade, concrete, and a beam. A user may be any person that interacts with light fixtures. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Light fixtures with example optics for backlight control (including portions thereof) can be made of one or more of a number of suitable materials to allow the light fixtures to meet certain standards and/or regulations while also maintaining durability in light of the one or more conditions under which the light fixtures and/or other associated components (e.g., an example optic for backlight control), including components thereof, of the light fixtures can be exposed. Examples of such materials can include, but are not limited to, aluminum, stainless steel, fiberglass, glass, plastic, polymer, ceramic, and rubber.

Example optics for backlight control, or portions or components thereof, described herein can be made from a single piece (as from a mold, injection mold, die cast, or extrusion process). In addition, or in the alternative, example optics for backlight control (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example optic for backlight control to become coupled, directly or indirectly, to one or more other components (e.g., a frame, a tray) of the optic, to some other component of a light fixture, and/or to a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example optic for backlight control can be coupled to another component of the optic, to some other component of a light fixture, and/or to a structure by the direct use of one or more coupling features.

In addition, or in the alternative, a portion of an example optic for backlight control can be coupled to another component of the optic, to another component (e.g., an enclosure, a housing) of a light fixture, and/or to a structure using one or more independent devices that interact with one or more coupling features disposed on a component of the optic. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of optics for backlight control for light fixtures, one or more of the components shown may be omitted, repeated, and/or substituted. Accordingly, example embodiments of optics for backlight control for light fixtures should not be considered limited to the specific arrangements of components shown in any of the figures. For example, features shown in one or more figures or described with respect to one embodiment can be applied to another embodiment associated with a different figure or description.

In certain example embodiments, light fixtures having example optics for backlight control are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the light fixtures to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of optics for backlight control for light fixtures will be described more fully hereinafter with reference to the accompanying drawings, in which example embodiments of optics for backlight control for light fixtures are shown. Optics for backlight control for light fixtures may, however, be embodied in many different forms and should not be construed as limited to the example embodiments set forth herein. Rather, these example embodiments are provided so that this disclosure will be thorough and complete, and will fully convey the scope of optics for backlight control for light fixtures to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation. Such terms are not meant to limit embodiments of optics for backlight control for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a lighting system 100 according to the current art. The lighting system 100 in this case includes a light fixture 110 in the form of a streetlight. The light fixture 110 of the lighting system 100 is mounted to a structure 113 in the form of a pole 111 with an extension 112 that is disposed toward a top end of the pole 111 and extends away from the pole 111. The bottom end of the pole 111 is mounted into a surface 102 (e.g., the ground, pavement). The light fixture 110 emits light within a light distribution range 117. Most of the light distribution range 117 falls within a target volume of space 118 (an area that is supposed to be illuminated by the light fixture 110), but some of the light distribution range 117 falls within an avoided volume of space 119 (an area that is not supposed to be illuminated by the light fixture 110, such as the base of the pole 111). In other words, some of the light emitted by the light fixture 110 is backlighting an area that should not be illuminated. The part of the surface 102 where the pole 111 is mounted can be part of the avoided volume of space 119.

In some cases, the light emitted by the light fixture 110 within the light distribution range 117, whether within the target volume of space 118 or the avoided volume of space 119, can be unevenly distributed. For example, some of the light emitted by the light fixture may be concentrated within the light distribution range 117 as "hot spots". Example optics for backlight control can eliminate backlighting of the light fixture. Further, example optics for backlight control can more evenly distribute light emitted by the light fixture.

FIG. 2 shows a lighting system 200 according to certain example embodiments. Referring to FIGS. 1 and 2, the lighting system 200 of FIG. 2 in this case includes a light fixture 220 in the form of a streetlight. As with the light fixture 110 of FIG. 1, the light fixture 220 of the lighting system 200 of FIG. 2 is mounted to a structure 213 in the form of a pole 211 with an extension 212 that is disposed toward a top end of the pole 211 and extends away from the pole 211. The bottom end of the pole 211 is mounted into a surface 202 (e.g., the ground, pavement). The light fixture 220 emits light within a light distribution range 217. The part of the surface 202 where the pole 211 is mounted can be part of the avoided volume of space 219. Unlike the light distribution range 117 of FIG. 1, the light distribution range 217 of FIG. 2 falls entirely within a target volume of space 218. None of the light emitted by the light fixture 220 is directed to an avoided volume of space 219. In other words, the example optic used with the light fixture 220 effectively eliminates backlighting.

FIG. 3 shows a block diagram of the light fixture 220 of FIG. 2. Referring to FIGS. 2 and 3, the light fixture 220 of FIG. 3 includes a housing 324 and an optical device assembly 330 that is coupled to the housing 324. The housing 324 can be used to house one or more of a number of components. For example, as shown in FIG. 3, the housing 324 can house a driver 321 (or other form of a power supply) and a controller 322. Examples of other components that can be disposed in, disposed on, and/or integrated with the housing 324 can include, but are not limited to, a sensor device (e.g., a photosensor, a motion detector), electrical wiring, a heat sink, and an energy storage device (e.g., a battery). The optical device assembly 330 in this case includes an example optical device 340 and one or more light source assemblies 325 disposed within the optical device 340. More details about the optical device 340 and the light source assemblies 325 are discussed below.

Figure 4A:
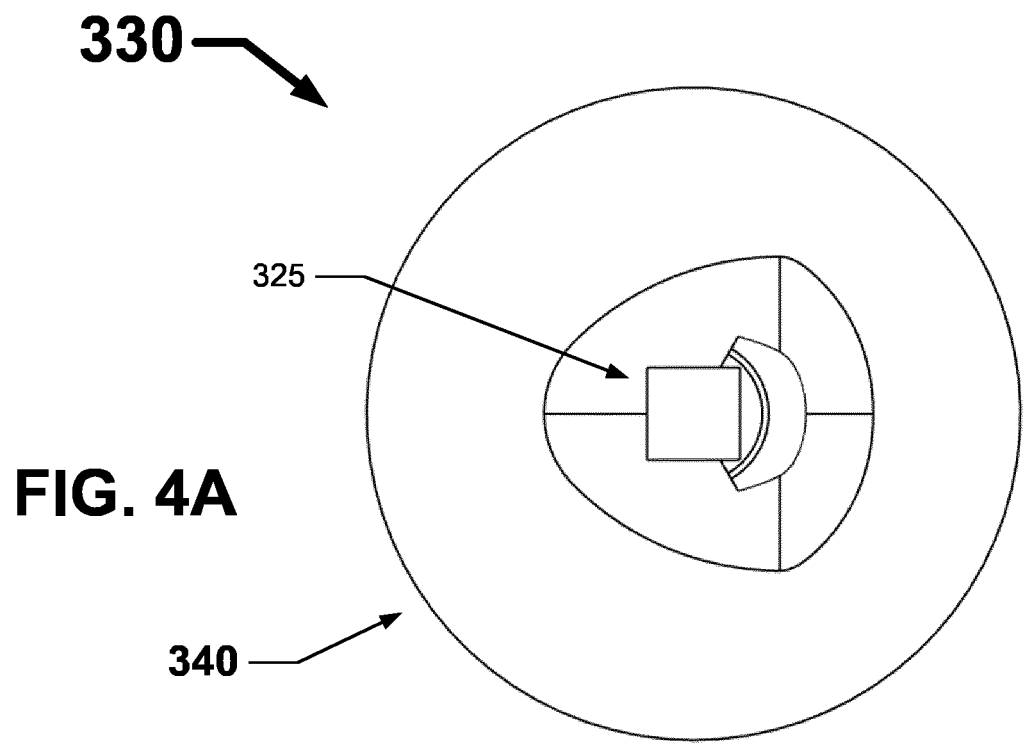
FIGS. 4A and 4B show various views of the optical device assembly of the light fixture of FIGS. 2 and 3 according to certain example embodiments.
Figure 4B:
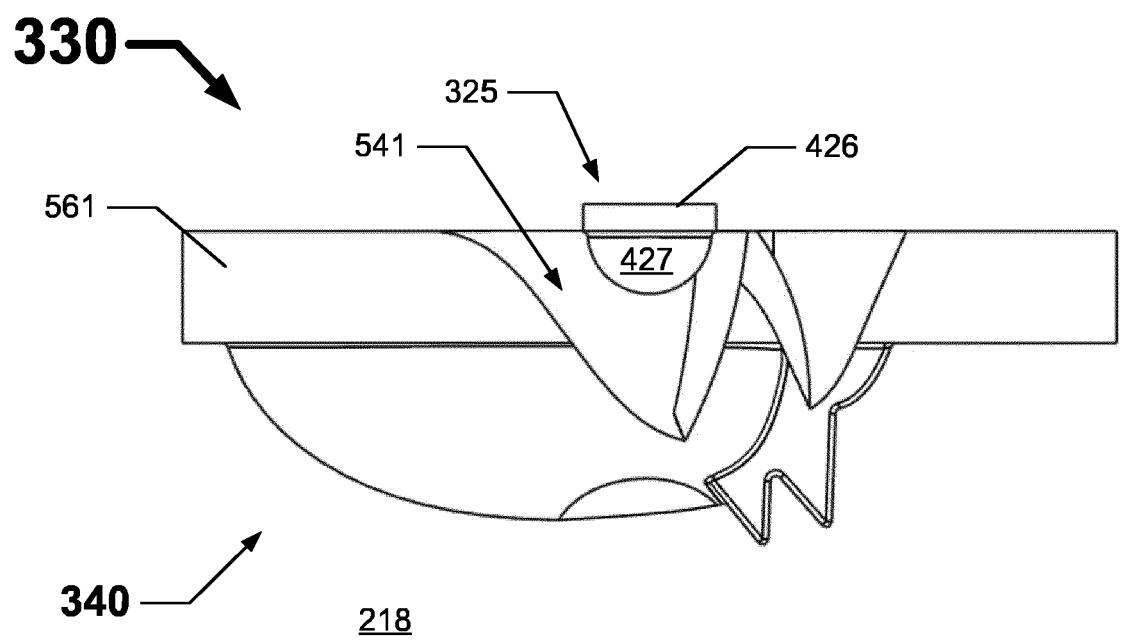

FIGS. 4A and 4B show various views of the optical device assembly 330 of the light fixture 220 of FIGS. 2 and 3 according to certain example embodiments. Specifically, FIG. 4A shows a top view of the optical device assembly 330. FIG. 4B shows a sectional side view of the optical device assembly 330. Referring to FIGS. 2 through 4B, the light source assembly 325 is configured to provide light that is used to illuminate the target volume of space 218. The light source assembly 325 can include one or more of a number of components. For example, the light source assembly 325 of FIGS. 4A and 4B includes a circuit board 426 and a light source 427.

The circuit board 426 of the light source assembly 325 can be any type of circuit board (e.g., a printed circuit board) upon which one or more of a number of components (e.g., a resistor, a diode, a capacitor, a transistor, a heat sink, an integrated circuit, an inductor, a socket, a terminal block, a switch) can be disposed. Also disposed on the circuit board 426 is one or more of the light sources 427. A light source 427 can be any of a number of different types of light sources, including but not limited to light-emitting diode (LED) light sources, fluorescent light sources, organic LED light sources, incandescent light sources, and halogen light sources. When the light source 427 is a LED light source, the light source 427 can include any type of LED technology, including, but not limited to, chip on board and discrete die.

In this case, the light source assembly 325 is positioned relative to the optical device 340 such that the top surface of the circuit board 426 (where the light source 427 is coupled) is substantially planar with the top surface of the base body 561 of the optical device 340. As a result, the light source 427 is disposed within the cavity 541 of the optical device 340. As shown below with respect to FIGS. 6 through 10, the light broadcast by the light source 427 is manipulated by various features of the optical device 340 and broadcast into the target volume of space 218. The position of the light source 427 within the cavity 541 can affect how the light emitted by the light source 427 is manipulated by the optical device 340 and distributed into the target volume of space 218. More details about the optical device 340 are provided below with respect to FIGS. 5A through 5E.

Figure 5A:
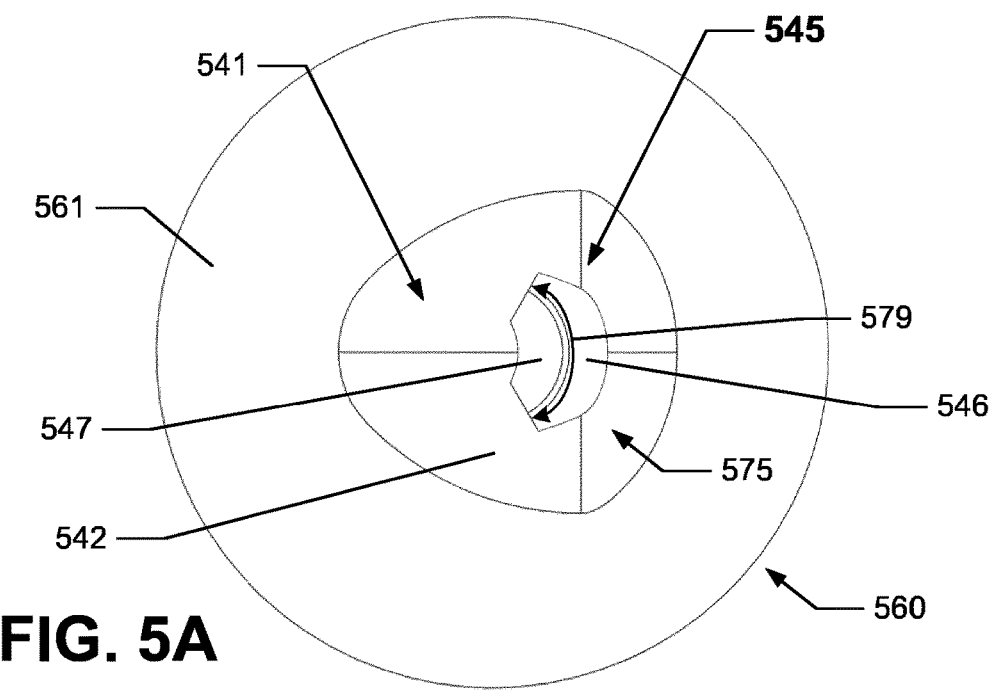
FIGS. 5A through 5E show various views of the optical device of FIGS. 4A and 4B according to certain example embodiments.
Figure 5B:
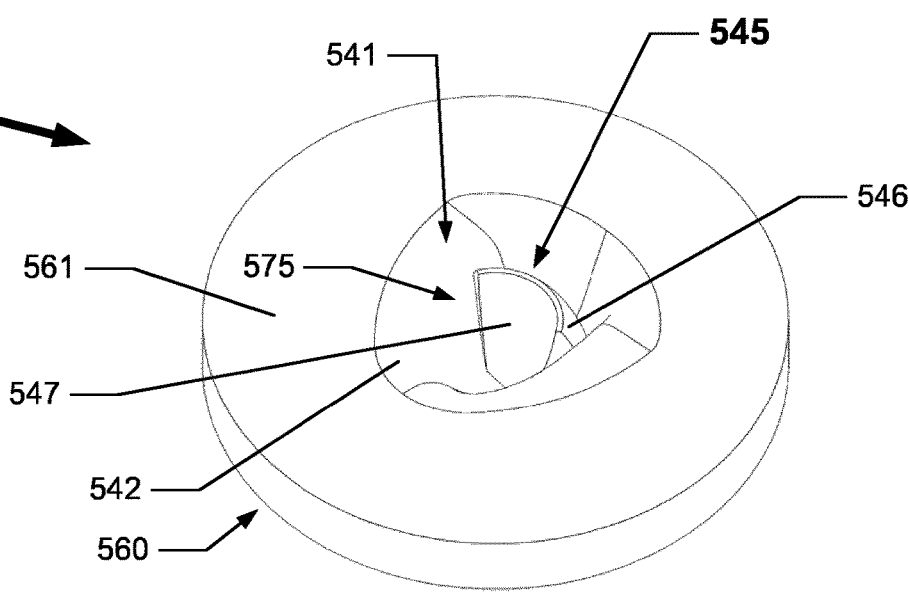
Figure 5C:
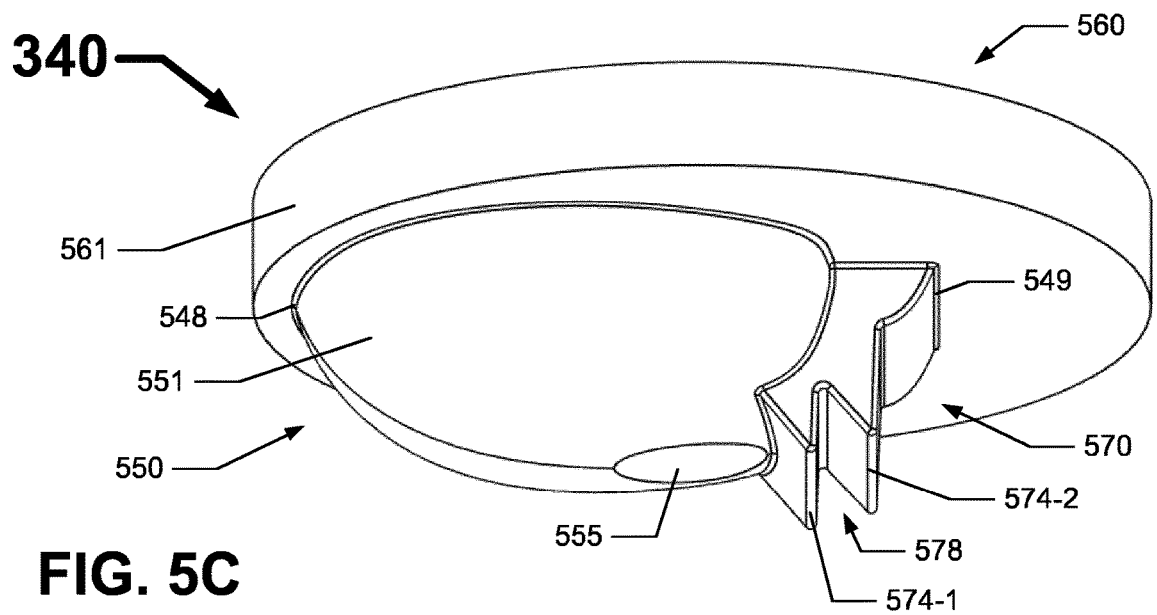
Figure 5D:
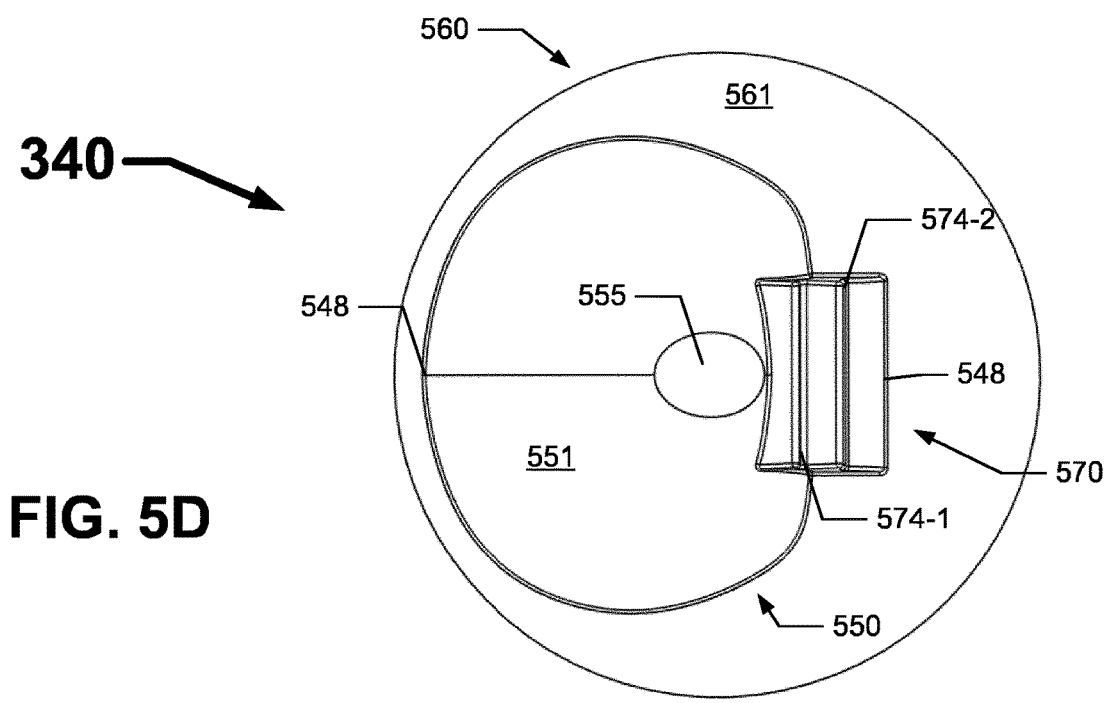
Figure 5E:
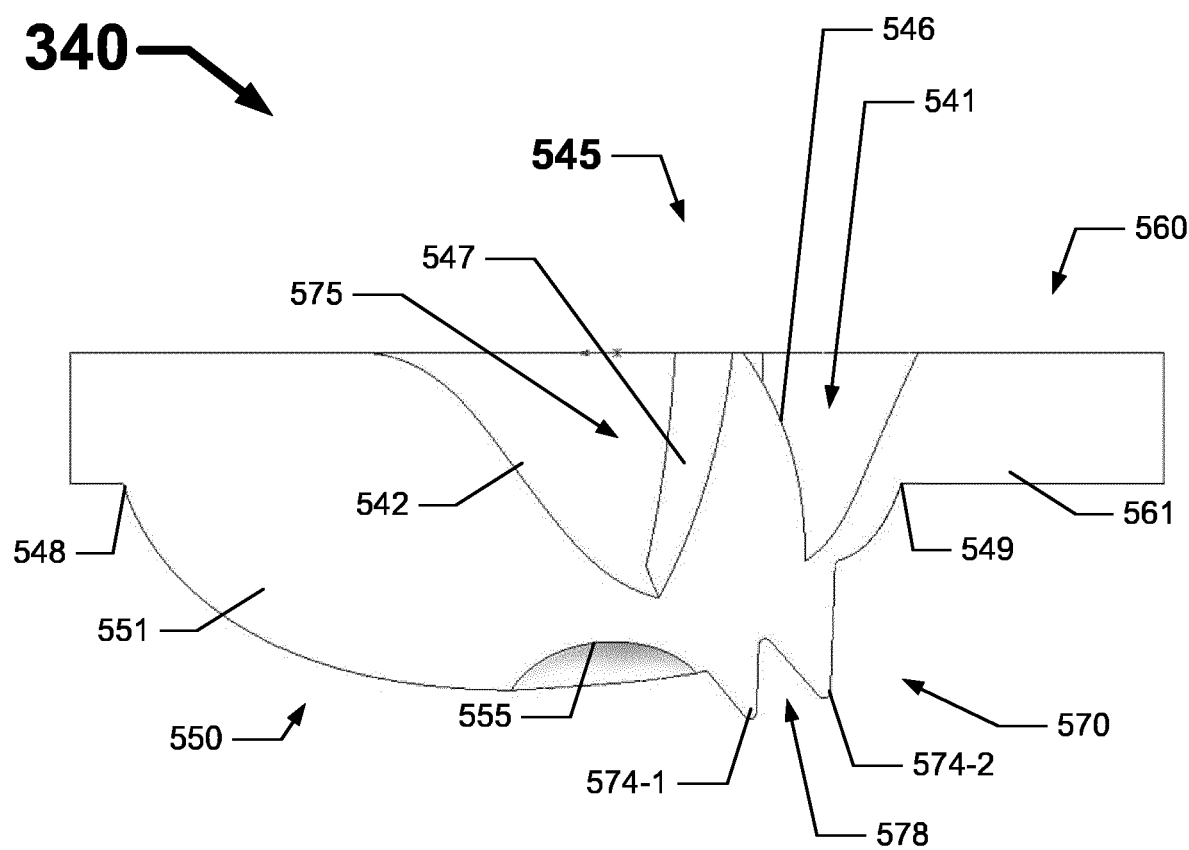

FIGS. 5A through 5E show various views of the optical device 340 of FIGS. 4A and 4B according to certain example embodiments. Specifically, FIG. 5A shows a top view of the optical device 340. FIG. 5B shows a top perspective view of the optical device 340. FIG. 5C shows a bottom perspective view of the optical device 340. FIG. 5D shows a bottom view of the optical device 340. FIG. 5E shows a cross-sectional side view of the optical device 340. Referring to FIGS. 2 through 5E, the optical device 340 of FIGS. 5A through 5E is configured to manipulate light emitted by a light source (e.g., light source 427) so that none of the light is directed into the avoided volume of space 219. The example optical device 340 can also substantially evenly distribute the light emitted by a light source within the target volume of space 218 so that there are no "dead zones" (areas within the target volume of space 218 where there is little or no light) or "hot spots" (areas within the target volume of space 218 where light is intensified or concentrated).

The example optical device 340 of FIGS. 5A through 5E can include one or more of a number of features and/or components. For example, the optical device 340 in this case includes an optic portion 550 and a base 560 disposed atop the optic portion 550. The base 560 has a base body 561 that includes one or more of a number of coupling features (e.g., apertures, recesses, protrusions, tabs) that allow the optical device 340 to directly or indirectly couple to the housing 324 of the light fixture 220. The base body 561 can be made of a material that allows some of the light emitted by a light source (e.g., light source 427) to propagate through some or all of its outer perimeter. Alternatively, the base body 561 can be made of or coated with a material that prevents the light emitted by a light source (e.g., light source 427) from propagating through some or all of its outer perimeter.

The optic portion 550 of the optical device 340 can include one or more of a number of features and/or components. For example, in this case, the optic portion 550 includes an optic body 551, a cavity 541 disposed within the optic body 551, a total internal reflector (TIR) 545 disposed at least partially within the cavity 541, and diffusing feature 555. The optic body 551 in this example has a front end 548, a rear end 549, and a curved bottom surface disposed between the front end 548 and the rear end 549. The optic body 551 in this case is substantially symmetrical about a vertical plane that intersects the middle of the front end 548 and the middle of the rear end 549. When viewed from below, as shown in FIG. 5D, the length and width of the base body 561 of the base 560 are larger than the length and width of the optic body 551 of the optic portion 550.

The cavity 541 in the optic body 551 in this case is open at a top side of the optic body 551. The cavity 541 in this case also extends through the entire thickness of the base body 561 of the base 560. The cavity 541 is configured to receive a light source (e.g., light source 427). As such, when the light source is illuminated, the cavity 541 is configured to receive the light emitted by the light source. In this example, the cavity 541 also has disposed therein part (the top portion 575) of the TIR 545, which is configured to be disposed adjacent to the light source 427, as shown in FIGS. 4A and 4B above. The cavity 541 is defined by one or more walls 542 in the optic body 551. The walls 542 can be configured to allow light to pass therethrough to enter the optic body 551.

The TIR 545 can be configured to eliminate (or greatly reduce) backlighting projected through the optical device 340 so that little to no light is directed toward an avoided volume of space (e.g., avoided volume of space 219). The TIR 545 can also be configured to substantially evenly distribute the light emitted therethrough into the target volume of space (e.g., target volume of space 218). One or more of the outer surfaces (e.g., the back surface 546) can be made of, or can include, a reflective and/or refractive material to reflect, rather than refract, light. In such a case, the TIR 545 (or portions thereof, such as the top portion 575, the exterior TIR feature 574-2 of the bottom portion 570) can be a total internal reflection optic, only allowing light to exit the TIR 545 through certain surfaces (e.g., the front surface of the exterior TIR feature 574-1, the front surface of the exterior TIR feature 574-2).

The TIR 545 can have any of a number of different configurations and/or features to accomplish these objectives. For example, the TIR 545 in this case has a top portion 575 and a bottom portion 570. As discussed above, the top portion 575 of the TIR 545 is disposed within the cavity 541 of the optic body 551 and the base body 561. The top portion 575 of the TIR 545 includes a front surface 547 and a back surface 546. In this example, the front surface 547 has a sweep path 579 that is concave. The sweep path 579 can have a radius with the focal point coinciding with the position of the light source 427. Alternatively, the sweep path 579 can be convex and/or can have some other radius or curvature without a radius.

The back surface 546 can also have a sweep path, with or without a radius. Alternatively, the reflective back surface 546 can have a curvature without a radius. The front surface 547 of the top portion 575 of the TIR 545 can be configured to receive some of the light emitted by the light source 427. In such a case, some of the light that passes through the front surface 547 is reflected downward off the back surface 546 of the top portion 575 of the TIR 545 toward the bottom portion 570 of the TIR 545, while a remainder of the light that passes through the front surface 547 of the top portion 575 of the TIR 545 continues substantially unobstructed toward the bottom portion 570 of the TIR 545.

The bottom portion 570 of the TIR 545 in this case extends beyond (e.g., downward from) the curved bottom surface of the optic body 551. The bottom portion 570 of the TIR 545 can include multiple (e.g., two, three, four) exterior TIR features 574. For example, in this instance, the bottom portion 570 of the TIR 545 has two exterior TIR features 574 (exterior TIR feature 574-1 and exterior TIR feature 574-2). Exterior TIR feature 574-1 and exterior TIR feature 574-2 are "V" shaped protrusions that are substantially parallel with each other, with exterior TIR feature 574-2 being positioned closer to the rear end 549 of the optic body 551, but with both exterior TIR features 574 positioned proximate to the rear end 549 of the optic body 551.

Also, exterior TIR feature 574-1 and exterior TIR feature 574-2 in this example are substantially perpendicular to a center line that runs between the front end 548 and the rear end 549 of the optic body 551. Also, exterior TIR feature 574-1 and exterior TIR feature 574-2 are separated from each other by an air gap 578. In this case, exterior TIR feature 574-2 is larger than exterior TIR feature 574-1. In alternative embodiments, the shape, size, width, and other characteristics of each of the exterior TIR features 574 can vary, based on such factors as the extent of the lack of backlighting desired and the desired distribution of light in the target volume of space 218.

The diffusing feature 555 of the optic portion 550 can be configured to perform one or more of a number of functions. For example, the diffusing feature 555 of the optic portion 550 can be configured to redirect a portion of the light received directly from a light source (e.g., light source 427) through part of the optic body 551, without interacting with the TIR 545, into the target volume of space 218 and away from the avoided volume of space 219. As another example, the diffusing feature 555 of the optic portion 550 can be configured to redirect some of the light emitted by the light source 427 that is reflected off of the back surface 546 of the top portion 575 of the TIR 545 into the target volume of space 218 and away from the avoided volume of space 219.

The diffusing feature 555 can have any of a number of configurations to perform its functions. For example, in this case, the diffusing feature 555 can have a concave surface disposed on the curved bottom surface of the optic body 551 adjacent to the exterior TIR feature 574-1. The concave surface of the diffusing feature 555 can have the effect of spreading the light that passes therethrough into the target volume of space 218. In this instance, as shown in FIG. 5D, the diffusing feature 555 is substantially symmetrical about a vertical plane that intersects the middle of the front end 548 and the middle of the rear end 549 of the optic body 551. The various characteristics (e.g., shape, size, radius, width, length) of the diffusing feature 555 can vary based on one or more of a number of factors that can include, but are not limited to, the extent of the lack of backlighting desired and the desired distribution of light in the target volume of space 218.

Figure 6:
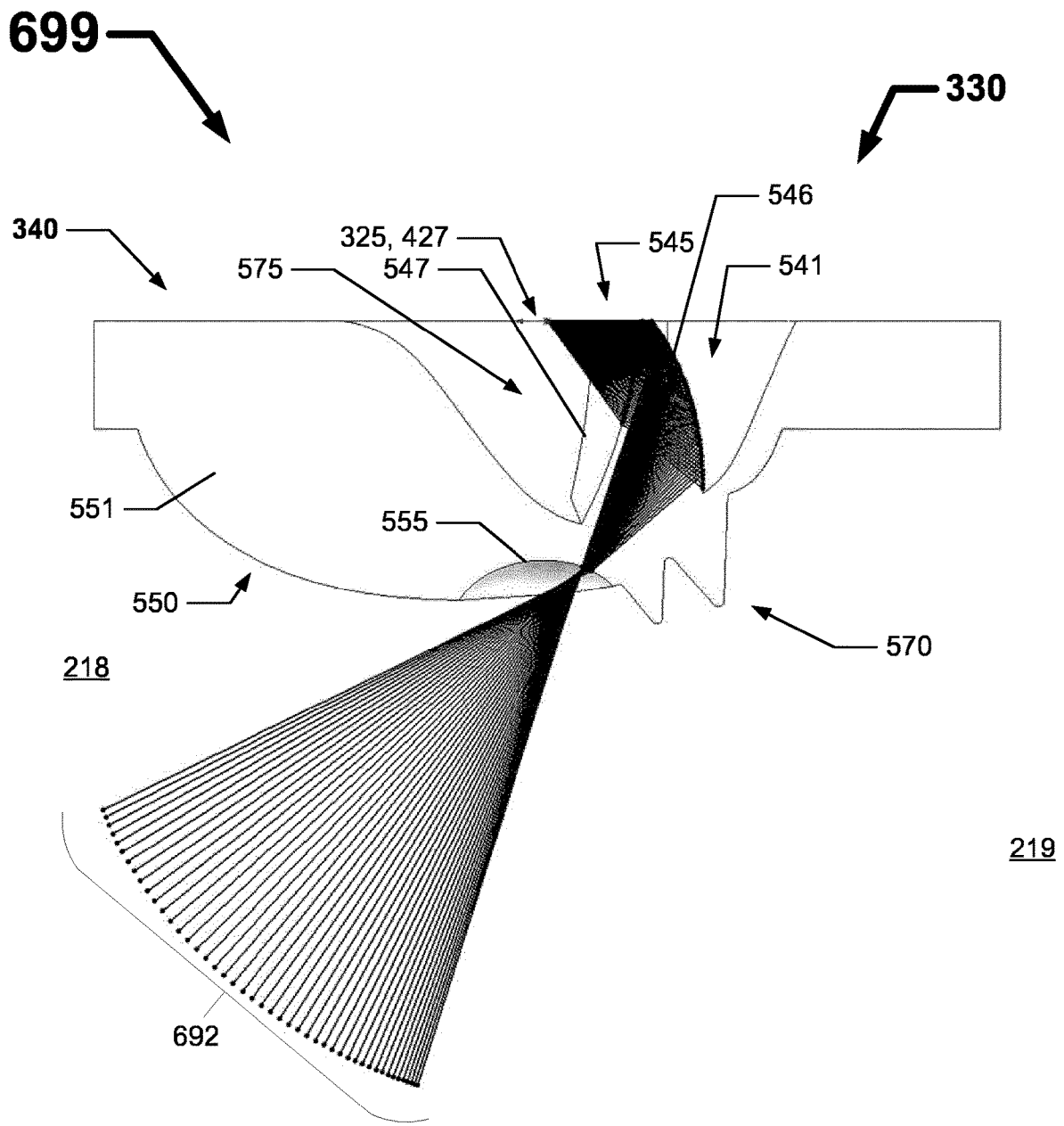
FIG. 6 shows a subassembly that includes a light distribution pattern through part of the optical assembly of FIGS. 4A through 5E according to certain example embodiments.

FIG. 6 shows a subassembly 699 that includes a light distribution pattern 692 through part of the optical assembly 330 of FIGS. 4A through 5E according to certain example embodiments. Referring to FIGS. 2 through 6, the subassembly 699 of FIG. 6 includes the optical assembly 330, which includes the light source 427 of the light source assembly 325 disposed in the cavity 541 within the optical device 340.

The light distribution pattern 692 in this case results from the portion of light emitted by the light source 427 that passes through the front surface 547 of the top portion 575 of the TIR 545, travels through the top portion 575 of the TIR 545, is reflected by the back surface 546 of the top portion 575 of the TIR 545, travels downward through the TIR 545, and exits through the diffusing feature 555 in the optic body 551 of the optic portion 550 into the target volume of space 218. In this case, the light in the light distribution pattern 692 avoids the bottom portion 570 of the TIR 545. Also, none of the light in the light distribution pattern 692 is projected into the avoided volume of space 219. As shown in FIG. 6, the diffusing feature 555 effectively spreads out the light distribution pattern 692. In other words, a portion of the light emitted by the light source 427 is redirected by the back surface 546 of the top portion 575 of the TIR 545 through the diffusing feature 555 directly into the target volume of space 218 in the light distribution pattern 692 and away from the avoided volume of space 219.

Figure 7:
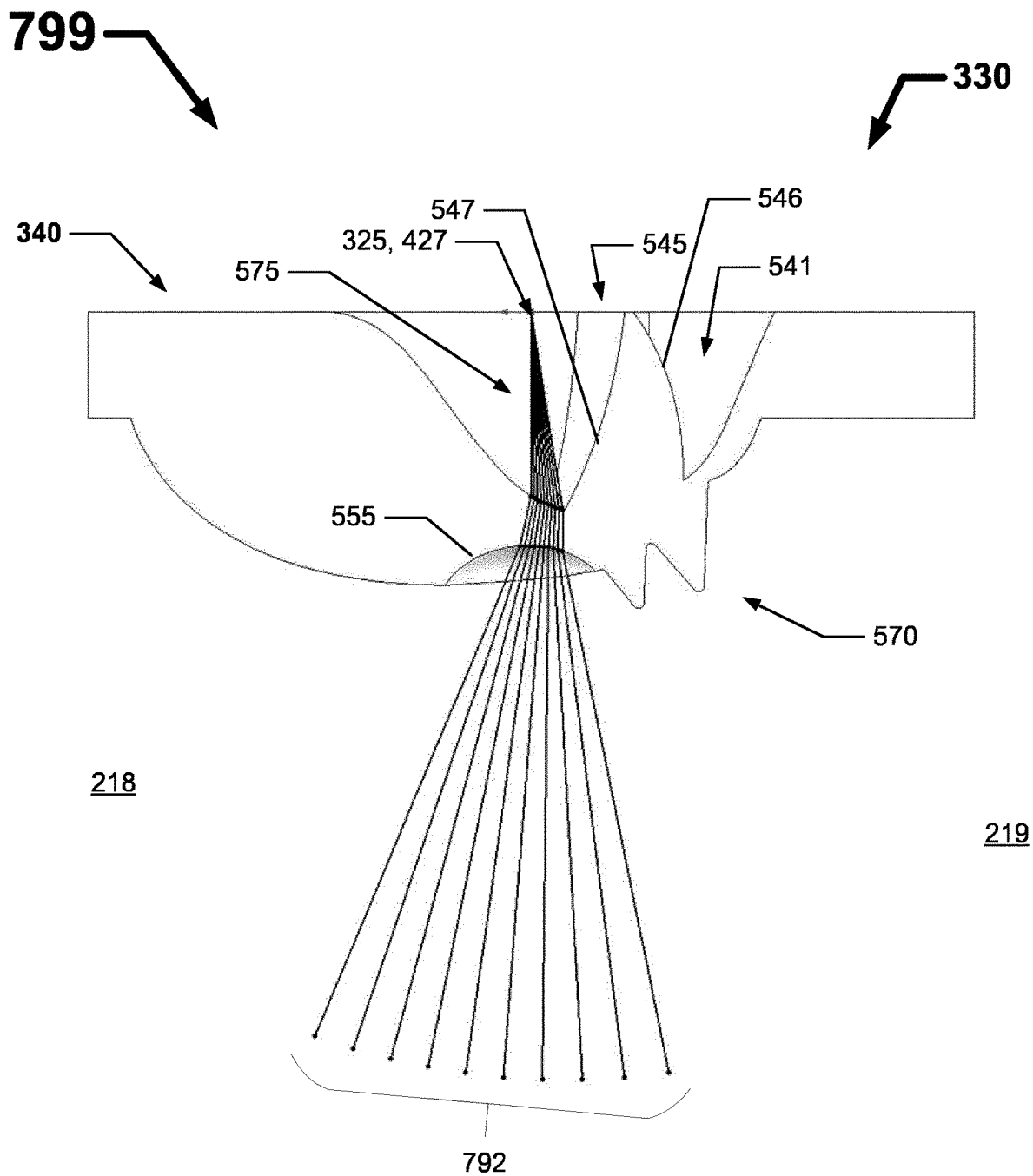
FIG. 7 shows a subassembly that includes a light distribution pattern through another part of the optical assembly of FIGS. 4A through 5E according to certain example embodiments.

FIG. 7 shows a subassembly 799 that includes a light distribution pattern 792 through another part of the optical assembly 330 of FIGS. 4A through 5E according to certain example embodiments. Referring to FIGS. 2 through 7, the subassembly 799 of FIG. 7 includes the optical assembly 330, which includes the light source 427 of the light source assembly 325 disposed in the cavity 541 within the optical device 340. The light distribution pattern 792 in this case results from the portion of light emitted by the light source 427 that avoids the top portion 575 and the bottom portion 570 of the TIR 545 and instead passes through the optic body 551 of the optic portion 550 and exits through the diffusing feature 555 into the target volume of space 218. None of the light in the light distribution pattern 792 is projected into the avoided volume of space 219. In other words, a subset of a portion of the light emitted by the light source 427 is redirected by the diffusing feature 555 directly into the target volume of space 218 in the light distribution pattern 892-1 and away from the avoided volume of space 219. As shown in FIG. 7, the diffusing feature 555 effectively spreads out the light distribution pattern 792.

Figure 8:
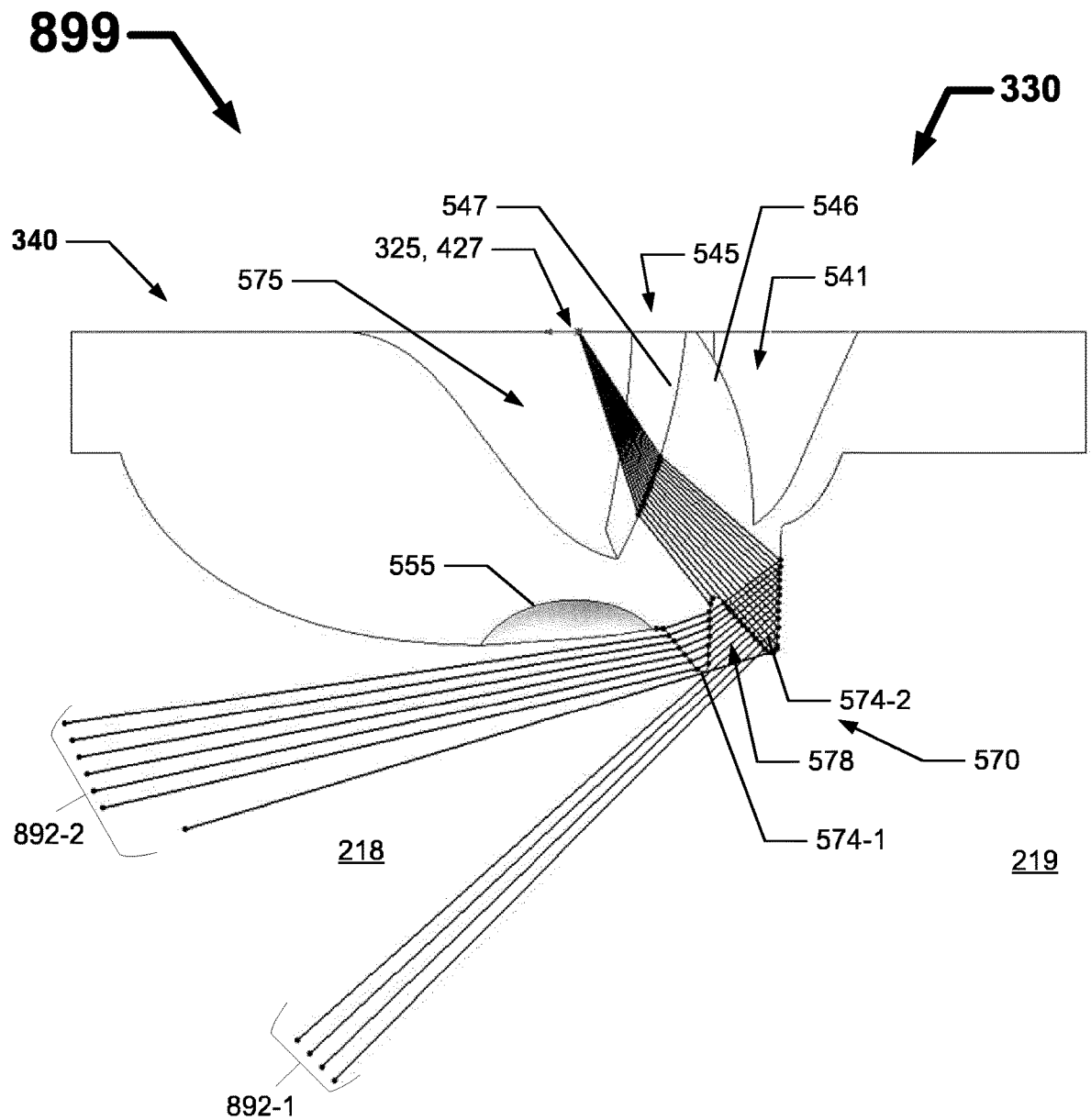
FIG. 8 shows a subassembly that includes two light distribution patterns through yet another part of the optical assembly of FIGS. 4A through 5E according to certain example embodiments.

FIG. 8 shows a subassembly 899 that includes two light distribution patterns 892 (light distribution pattern 892-1 and light distribution pattern 892-2) through yet another part of the optical assembly 330 of FIGS. 4A through 5E according to certain example embodiments. Referring to FIGS. 2 through 8, the subassembly 899 of FIG. 8 includes the optical assembly 330, which includes the light source 427 of the light source assembly 325 disposed in the cavity 541 within the optical device 340.

The light distribution patterns 892 in this case result from the portion of light emitted by the light source 427 that passes through and is refracted by the front surface 547 of the top portion 575 of the TIR 545, travels through the top portion 575 of the TIR 545 but avoids the back surface 546 of the top portion 575 of the TIR 545, travels downward through the TIR 545 to exterior TIR feature 574-2. The light in the light distribution pattern 892-1 is reflected off the back surface of exterior TIR feature 574-2 and exits through the front surface of exterior TIR feature 574-2 of the TIR 545 into the target volume of space 218.

The light in the light distribution pattern 892-2 is reflected off the back surface of exterior TIR feature 574-2, exits through the front surface of exterior TIR feature 574-2 of the TIR 545, passes through the air gap 578 between exterior TIR feature 574-2 and exterior TIR feature 574-1, passes through and is refracted by exterior TIR feature 574-1, and passes out of exterior TIR feature 574-1 into the target volume of space 218. In this case, the light in the light distribution patterns 892 avoids the bottom portion 570 of the TIR 545. Also, none of the light in the light distribution patterns 892 is projected into the avoided volume of space 219. In other words, a subset of a portion of the light emitted by the light source 427 is redirected by external TIR feature 574-2 directly into the target volume of space 218 in the light distribution pattern 892-1 and away from the avoided volume of space 219, and another subset of the portion of the light is redirected by external TIR feature 574-2 to the external TIR feature 574-1, which redirects the light into the target volume of space 218 in the light distribution pattern 892-2 and away from the avoided volume of space 219.

Figure 9:
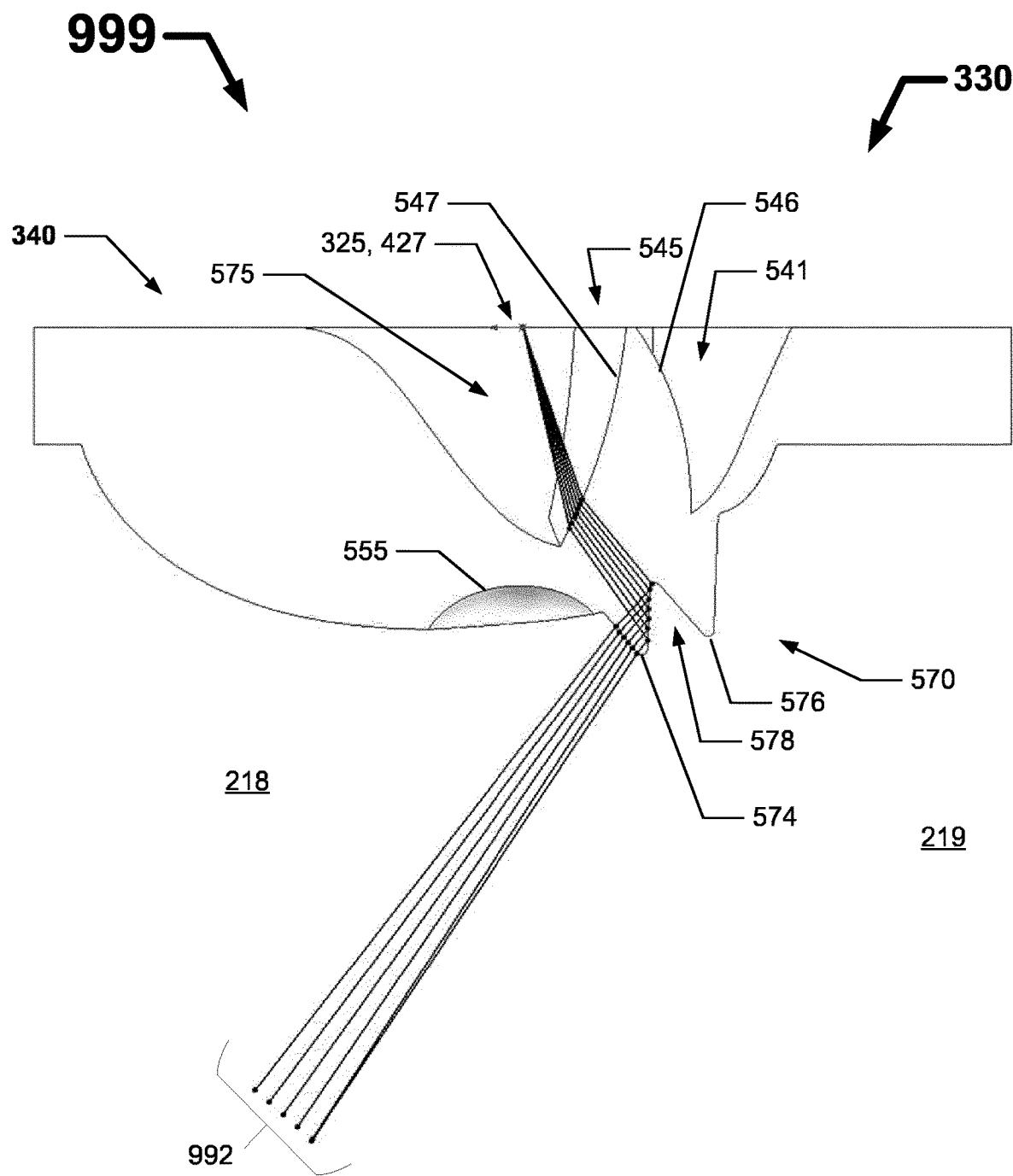
FIG. 9 shows a subassembly that includes a light distribution pattern through still another part of the optical assembly of FIGS. 4A through 5E according to certain example embodiments.

FIG. 9 shows a subassembly 999 that includes a light distribution pattern 992 through still another part of the optical assembly 330 of FIGS. 4A through 5E according to certain example embodiments. Referring to FIGS. 2 through 9, the subassembly 999 of FIG. 9 includes the optical assembly 330, which includes the light source 427 of the light source assembly 325 disposed in the cavity 541 within the optical device 340.

The light distribution pattern 992 in this case result from the portion of light emitted by the light source 427 that passes through and is refracted by the front surface 547 of the top portion 575 of the TIR 545, travels through the top portion 575 of the TIR 545 but avoids the back surface 546 of the top portion 575 of the TIR 545, travels downward through the TIR 545 to exterior TIR feature 574-1. The light in the light distribution pattern 992 is reflected off the back surface of exterior TIR feature 574-1 and exits through the front surface of exterior TIR feature 574-1 of the TIR 545 into the target volume of space 218. In other words, a portion of the light emitted by the light source 427 is redirected by external TIR feature 574-1 directly into the target volume of space 218 in the light distribution pattern 992 and away from the avoided volume of space 219.

Figure 10:
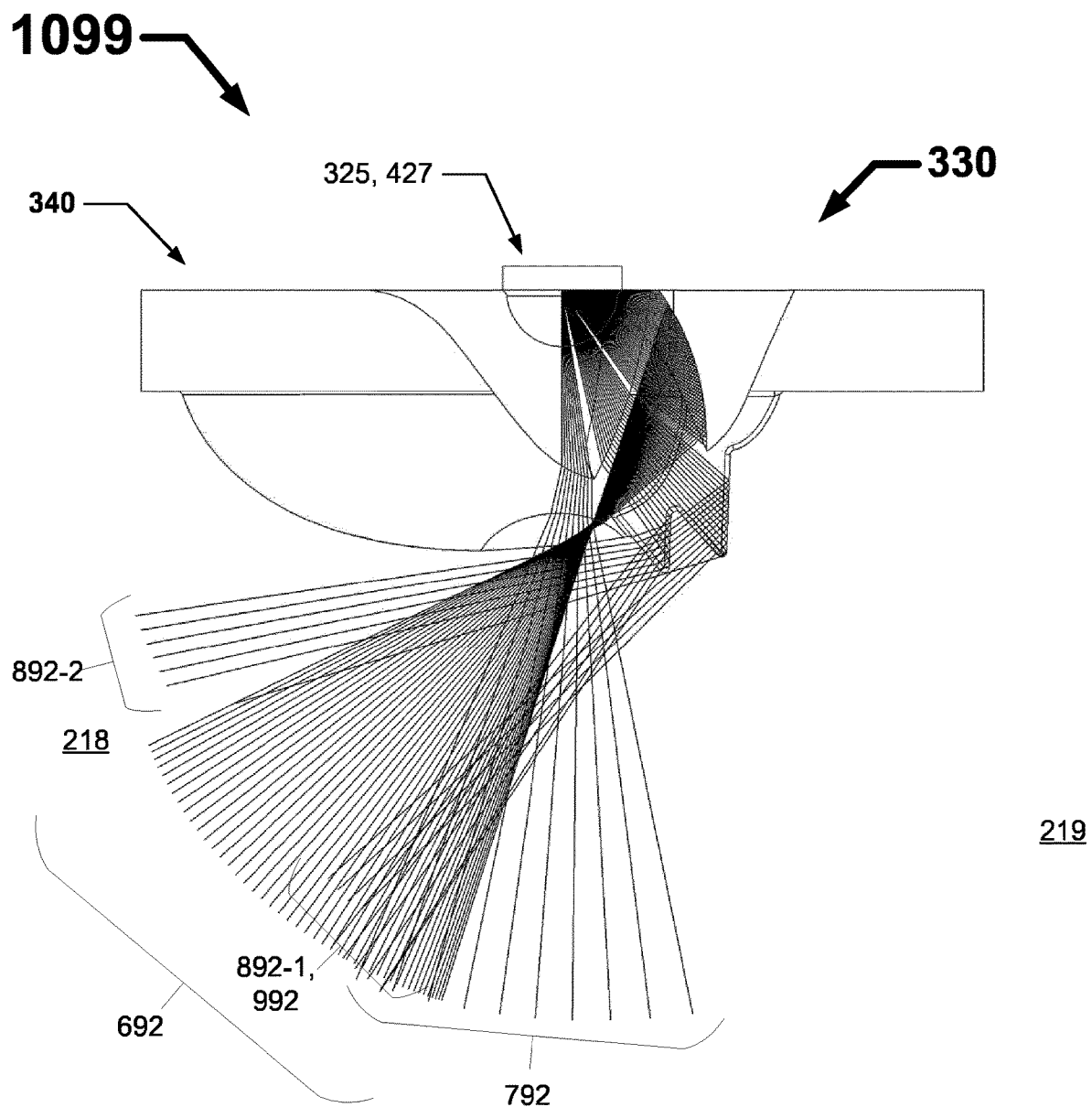
FIG. 10 shows a subassembly that is an aggregate of the light distribution patterns of FIGS. 6 through 9.

FIG. 10 shows a subassembly 1099 that is an aggregate of the light distribution patterns of FIGS. 6 through 9. Referring to FIGS. 2 through 10, the subassembly 1099 shows the light emitted by the light source 427 of the light source assembly 325 in the light distribution pattern 692, the light distribution pattern 792, the light distribution pattern 892-1, the light distribution pattern 892-2, and the light distribution pattern 992, each formed by different portions of the optical device 340 of the optical device assembly 330. Without the use of example embodiments, at least some of the light in these light distribution patterns would be directed into the avoided volume of space 219. By contrast, using an example optical device 340, none of the light is directed toward the avoided volume of space 219, and all of the light is directed into the target volume of space 218. Further, the light distribution patterns in FIG. 10 show that the light is substantially evenly distributed within the target volume of space 218, thereby avoiding "hot spots" and "dead zones".

For any light that is refracted by a part of the optical device 340, the amount of refraction of the light can depend on one or more of a number of factors. For example, as shown in FIG. 7 with respect to the light distribution pattern 792, the curvature of the diffusing feature 555 of the optical device 340 relative to the direction of the light radiating through that part of the diffusing feature 555 determines the path at which the light travels into the target volume of space 218. As another example, as shown in FIG. 8 with respect to the light distribution pattern 892-2, the angle of the rear surface of the exterior TIR feature 574-1 of the optical device 340 relative to the direction of the light radiating through rear surface of the exterior TIR feature 574-1 from the air gap 578 determines the path at which the light travels within the exterior TIR feature 574-1.

Figure 11:
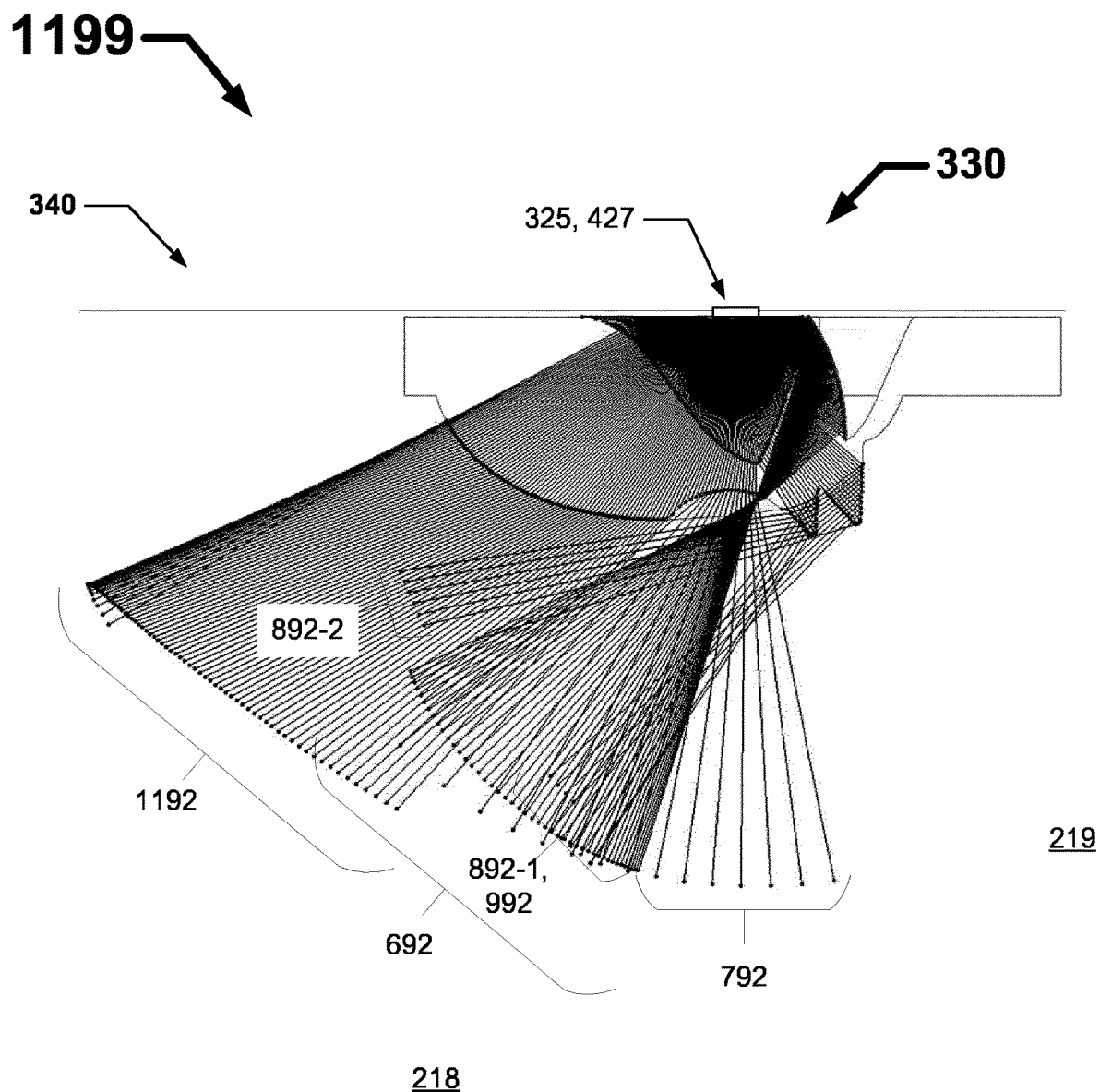
FIG. 11 shows a subassembly that shows all of the light distribution patterns using the optical device assembly of FIGS. 4A through 5E.

FIG. 11 shows a subassembly 1199 that shows all of the light distribution patterns using the optical device assembly 330 of FIGS. 4A through 5E. Referring to FIGS. 2 through 10, in addition to the light distribution pattern 692, the light distribution pattern 792, the light distribution pattern 892-1, the light distribution pattern 892-2, and the light distribution pattern 992 discussed above with respect to FIGS. 6 through 10, the subassembly 1199 shows the light emitted by the light source 427 of the light source assembly 325 in a light distribution pattern 1192 formed by other portions (e.g., not involving the TIR 545 or the diffusing feature 555) of the optical device 340 of the optical device assembly 330. As discussed above, using an example optical device 340, none of the light is directed toward the avoided volume of space 219, and all of the light is directed into the target volume of space 218. Further, the light distribution patterns in FIG. 11 show that the light is substantially evenly distributed within the target volume of space 218, thereby avoiding "hot spots" and "dead zones".

Example embodiments can be used to eliminate or significantly reduce backlighting for certain types of light fixtures. Example embodiments can be utilized when the light fixture is installed with respect to a structure (e.g., a pole, a building wall). Example embodiments can be used with light fixtures having any of a number of sizes and/or features. Example embodiments can be used in new installations of light fixtures as well as retrofitting existing light fixtures. Example embodiments also provide a number of other benefits. Such other benefits can include, but are not limited to, increased ease of maintenance, greater ease of use, catering to user preferences, modularity, ease of installation, and compliance with industry standards that apply to certain light fixtures with which example embodiments can be used.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. An optical device for a light fixture, the optical device comprising:
   an optic portion comprising:
      an optic body having a front end, a rear end, and a curved bottom surface disposed between the front end and the rear end;
      a cavity disposed within the optic body, wherein the cavity is open at a top side of the optic body, and wherein the cavity is configured to receive light emitted by a light source of the light fixture;
      a total internal reflector (TIR) having:

a top portion and a bottom portion, wherein the top portion of the TIR is disposed within the cavity of the optic body and comprises a back surface, wherein the bottom portion of the TIR extends beyond the curved bottom surface of the optic body, wherein the bottom portion of the TIR comprises a first exterior TIR feature and a second exterior TIR feature, wherein the second exterior TIR feature is configured to redirect a first portion of a first subset of the light into a target volume of space in a first light distribution pattern and away from an avoided volume of space, wherein the second exterior TIR feature is further configured to redirect a second portion of the first subset of the light toward the first exterior TIR feature, wherein the first exterior TIR feature is configured to receive the second portion of the first subset of the light from the second exterior TIR feature and redirect the second portion of the first subset of the light into the target volume of space in a second light distribution pattern and away from the avoided volume of space, wherein the first exterior TIR feature is further configured to redirect a second subset of the light into the target volume of space in a third light distribution pattern and away from the avoided volume of space, wherein the back surface of the TIR is configured to redirect a third subset of the light toward the target volume of space in a fourth light distribution pattern and away from the avoided volume of space, and wherein the optic portion further comprises a diffusing feature disposed on the curved bottom surface of the optic body adjacent to the first exterior TIR feature, wherein the diffusing feature is configured to redirect a fourth subset of the light into a fifth light distribution pattern.

2. The optical device of claim 1, wherein the first exterior TIR feature and the second exterior TIR feature are parallel with each other.

3. The optical device of claim 2, wherein the first exterior TIR feature and the second exterior TIR feature are substantially perpendicular to a center line that runs between the front end and the rear end of the optic body.

4. The optical device of claim 2, wherein the first exterior TIR feature and the second exterior TIR feature are separated from each other by an air gap.

5. The optical device of claim 1, wherein the first exterior TIR feature and the second exterior TIR feature are positioned proximate to the rear end of the optic body.

6. The optical device of claim 1, wherein the first exterior TIR feature is smaller than the second exterior TIR feature.

7. The optical device of claim 1, wherein the top portion of the TIR further comprises a sweep path at its front surface, and wherein the front surface of the TIR is configured to receive some of the light emitted by the light source.

8. The optical device of claim 1, further comprising:
a base disposed atop the optic portion, wherein the base comprises a base body, and wherein the cavity and the top portion of the TIR extend through the base body.

9. The optical device of claim 1, wherein the diffusing feature is further configured to redirect the third subset of the light from the back surface of the TIR into the fourth light distribution pattern.

10. The optical device of claim 1, wherein the diffusing feature has a concave surface when viewed from underneath the optic portion.

11. The optical device of claim 1, wherein the diffusing feature spreads the third subset of the light and the fourth subset of the light into the target volume of space.

12. The optical device of claim 1, wherein the optic body is configured to have pass therethrough a remainder of the light emitted by the light source into the target volume of space, and wherein the remainder of the light excludes the first subset, the second subset, the third subset, and the fourth subset of the light.

13. A light fixture comprising the optical device of claim 1.

* * * * *